United States Patent [19]
Yoshida et al.

[11] Patent Number: 5,886,096
[45] Date of Patent: Mar. 23, 1999

[54] POLYAMIDE RESIN COMPOSITION, AND FIBERS, FILMS AND MOLDED ARTICLES USING THE SAME

[75] Inventors: Miho Yoshida; Tsunetoshi Matsuda; Masahiro Hosoda, all of Kyoto, Japan

[73] Assignee: Unitika Ltd., Hyogo, Japan

[21] Appl. No.: 916,450

[22] Filed: Aug. 22, 1997

[30] Foreign Application Priority Data

| Sep. 6, 1996 | [JP] | Japan | 8-236134 |
| Oct. 16, 1996 | [JP] | Japan | 8-273250 |
| Jan. 20, 1997 | [JP] | Japan | 9-007256 |

[51] Int. Cl.⁶ .............................. C08J 3/09; C08L 77/00
[52] U.S. Cl. ............................. 525/66; 574/436
[58] Field of Search ................. 525/66; 524/436

[56] References Cited

U.S. PATENT DOCUMENTS

| 4,876,301 | 10/1989 | Peerlkamp et al. | 524/255 |
| 4,963,610 | 10/1990 | Schmid et al. | 524/436 |
| 5,256,719 | 10/1993 | Sham et al. | 524/436 |
| 5,412,017 | 5/1995 | Gareiss et al. | 524/436 |
| 5,416,143 | 5/1995 | El Sayed et al. | 524/116 |

FOREIGN PATENT DOCUMENTS

| 51-64017 | 6/1976 | Japan . |
| 51-68651 | 6/1976 | Japan . |
| 55-18478 | 5/1980 | Japan . |
| 55-20007 | 5/1980 | Japan . |
| 55-20507 | 6/1980 | Japan . |
| 55-27172 | 7/1980 | Japan . |
| 1-213356 | 8/1989 | Japan . |

*Primary Examiner*—P. Hampton-Hightower
*Attorney, Agent, or Firm*—Sughrue, Mion, Zinn, Macpeak & Seas, PLLC

[57] ABSTRACT

A polyamide resin composition comprising a polyamide and an alkaline earth metal compound, wherein the amount of a cyclic monomer formed by melting said composition under the conditions of a moisture content of 0.02% by weight or less, at 0.01 Torr or below, at 250° C., and for 8 hours is not more than 0.7 parts by weight per 100 parts by weight of the polyamide; and fibers, films and molded articles with the use of the same.

19 Claims, No Drawings

POLYAMIDE RESIN COMPOSITION, AND FIBERS, FILMS AND MOLDED ARTICLES USING THE SAME

FIELD OF THE INVENTION

This invention relates to a polyamide resin composition having improved melt spinning properties, film-forming properties and molding properties. Polyamide resins are engineering plastics which are excellent in mechanical strength, heat resistance, chemical resistance, processability, etc. and have been widely employed as, for example, tire cords, clothes and packaging films in the fields of automobiles, electrical appliances, office machines, etc.

BACKGROUND OF THE INVENTION

In general, polyamide resin chips produced by melt polymerization or melt polycondensation contain about 10% by weight of the unreacted cyclic monomers or oligomers which are then eliminated by hot water extraction. Even after the elimination by hot water extraction, these cyclic monomers or oligomers are formed again during melt extrusion over a long period of time to, for example, produce fibers by melt spinning. These cyclic monomers or oligomers are accumulated around the nozzle tip and then undergo heat denaturation around the nozzle tip. As a result, yarns deformed, yarn breakage and yarn unevenness occur around the nozzle tip. In the production of films, cyclic monomers and oligomers are formed in the step of re-melting of chips, which brings about some problems such as film breakage and deterioration in the qualities. In addition, in the production of molded articles, the formation of cyclic monomers and oligomers causes problems of soiling molds and deteriorating the qualities.

Accordingly, attempts have been made to solve these problems in various ways, and the commonest method is to add inorganic compounds to polyamide resins. For example, JP-A-51-64017 proposes to add barium chloride, etc. in the step of the melt-spinning of a polyamide into fibers so as to thereby improve the melt spinning properties (The term "JP-A" as used herein means an "unexamined published Japanese patent application"). However, the chloride ion evolving from the compound employed in this method is not desirable, since it causes the corrosion of the equipment, etc. There have been known a number of other methods for improving the melt spinning properties of polyamides. For example, JP-B-55-18478 discloses a method which comprises applying a mold-releasing agent to the head so as to relieve the heat denaturation of the head, thus improving the melt spinning properties (The term "JP-B" as used herein means an "examined Japanese patent publication"). On the other hand, JP-B-55-20507 proposes a method for enhancing melt extrusion properties by adding a pyridinethiol oxide compound. However, the formation of cyclic monomers or oligomers in the step of re-melting can be hardly suppressed by these methods. Moreover, JP-A-1-213356 discloses a method in which the mechanical properties and heat radiation characteristics of a polyamide resin are improved by adding a certain amount of magnesium oxide, while JP-A-51-68651 discloses a method which comprises adding magnesium hydroxide as a flame-retardant. In these methods, however, the additives are employed in large amounts and, furthermore, the formation of cyclic monomers or oligomers in the step of re-melting cannot be suppressed. There are also proposed a nylon 6 composition containing magnesium oxide (JP-B-55-20007) and a nylon 6 composition containing a certain amount of fine particles of magnesium oxide having a specific crystalline structure (JP-B-55-27172). However, more than 1.0% by weight of cyclic monomers are formed in general, when chips of these resin compositions are molten again. Accordingly, these methods are still insufficient to solve the above-mentioned problems.

An object of the present invention is to provide a polyamide resin composition which suffers from little formation of a cyclic monomer in the steps of melt spinning, film formation, molding, etc. and can supply fibers, films and molded articles with excellent qualities.

SUMMARY OF THE INVENTION

The present inventors have conducted extensive studies in order to solve the above-mentioned problems. As a result, they have found that the objects can be successfully achieved by adding a specific alkaline earth metal compound to a polyamide resin.

Accordingly, the gist of the present invention resides in a polyamide resin composition comprising a polyamide and an alkaline earth metal compound, wherein the amount of a cyclic monomer formed by melting the composition under the conditions of a moisture content of 0.02% by weight or less, at 0.01 Torr or below, at 250° C., and for 8 hours is not more than 0.7 parts by weight per 100 parts by weight of the polyamide.

DETAILED DESCRIPTION OF THE INVENTION

The polyamide to be used in the present invention involves homopolymers and copolymers of polyamides. The polyamide to be used in the present invention means a melt-moldable polymer having amide bonds, which are formed from a lactam, an aminocarboxylic acid, or a diamine with a dicarboxylic acid.

Examples of the polyamide include homopolymers, copolymers and mixed polyamides of polycaproamide (nylon 6), poly(tetramethylene adipamide) (nylon 46), poly (hexamethylene adipamide) (nylon 66), poly (hexamethylene sebacamide) (nylon 610), poly (hexamethylene dodecamide) (nylon 612), poly (undecamethylene adipamide) (nylon 116), polyundecamide (nylon 11), polydodecamide (nylon 12), poly (trimethylhexamethylene terephthalamide) (nylon TMDT), poly(hexamethylene isophthalamide) (nylon 6I), poly (hexamethylene terephthal/isophthalamide) (nylon 6T/6I), poly[bis(4-aminocyclohexyl)methanedodecamide] (nylon PACM12), poly[bis(3-methyl-4-aminocylohexyl) methanedodecamide] (nylon dimethyl PACM12), poly (metaxylylene adipamide) (nylon MDX6), poly (undecamethylene terephthalamide) (nylon 11T) and poly (undecamethylene hexahydroterephthalamide) [nylon 11T (H)]. Among these polyamides, nylon 6 homopolymer or its copolymer is particularly preferable.

The nylon 6 homopolymer to be used in the present invention is a polymer obtained by polymerizing ε-caprolactam and consists of caproamide units.

The nylon 6 copolymer to be used in the present invention is obtained by polymerizing ε-caprolactam with one or more comonomers, which contains at least 50% by mol, still preferably at least 80% by mol, of caproamide units.

Examples of the comonomer to be copolymerized with ε-caprolactam include various aminocaproic acids, lactams other than ε-caprolactam and nylon salts. More particularly, 6-aminocaproic acid, 11-aminoundecanoic acid, 12-aminododecanoic acid, p-aminomethylbenzoic acid, ω-laurolactam, nylon 46 salt, nylon 66 salt, nylon 610 salt, nylon 6T salt, nylon 6I salt and a salt of metaxylylenediamine with adipic acid, and the like are used. Such a comonomer is copolymerized at a ratio of less than 50% by mol, still preferably less than 20% by mol.

Although the relative viscosity of the polyamide to be used in the present invention is not particularly limited, it preferably falls within a range of 1.5 to 5.0, when determined by using 96% by weight conc. sulfuric acid at 25° C. at a concentration of 1 g/dl. When the relative viscosity of the polyamide is less than 1.5, fibers, films and molded articles produced therefrom have poor mechanical strength. On the other hand, it is not desirable that the relative viscosity thereof exceeds 5.0, since the moldability of the composition is rapidly deteriorated in such a case.

In the present invention, the alkaline earth metal compound is used preferably in an amount of from 0.01 to 2 parts by weight, still preferably from 0.05 to 1 parts by weight, per 100 parts by weight of the polyamide. When the content of the alkaline earth metal is less than 0.01 parts by weight, the effects of the present invention can be scarcely expected. When the content exceeds 2 parts by weight, on the other hand, the characteristics of polyamide (i.e., mechanical properties, transparency, abrasion resistance, etc.) are deteriorated and clogging of a filter and yarn breakage frequently occur in the step of melt spinning. In this case, moreover, molds are soiled and products suffer from die line in the step of film formation or molding and, as a result, the qualities (transparency, etc.) of the films or molded articles are deteriorated.

As the alkaline earth metal compound to be used in the present invention, it is necessary to select such alkaline earth metal compounds that the amount of a cyclic monomer formed by melting the composition of the present invention under the conditions of a moisture content of 0.02% by weight or less, at 0.01 Torr or below, at 250° C., and for 8 hours become not more than 0.7 parts by weight per 100 parts by weight of the polyamide.

Examples of such alkaline earth metal compound include magnesium compounds, preferably mixed crystals represented by the following formula (1) or magnesium hydroxide are preferable:

$$(MgO)_x(Mg(OH)_2)_{1-x} \qquad (1)$$

wherein x represents a molar fraction; 0<x<1.

The mixed crystals of the above formula (1) can be obtained by baking magnesium hydroxide or magnesium carbonate at 300° to 1,500° C. in the air or in an inert gas. It is preferable that x range from 0.01 to 0.99, still preferably from 0.1 to 0.9.

The mixed crystals of the above formula (1) have an average particle size of preferably 7 μm or less, still preferably 5 μm or less. The microcrystalline size of MgO in the mixed crystals is preferably not more than 500 Å. The MgO microcrystalline size as described herein is a value calculated by the Scherrer method [*Chem. Mater.*, 3, 175–181 (1991)] from the half-width of the reflection profile in the wide-angle X-ray diffraction method (200) with the use of Cu-Kα ray (50 kV, 200 mA).

Any magnesium hydroxide may be used (for example, one obtained by treating a magnesium salt with an alkali, one obtained by soaking magnesium oxide in warm water at around 80° C. for several hours), so long as it has a final magnesium hydroxide content of at least 95% by mol. Magnesium hydroxide has an average particle size of preferably 10 μm or below, still preferably 9 μm or below. In addition, the microcrystalline size thereof is preferably about 1,000 Å. The microcrystalline size as described herein is a value calculated by the Scherrer method from the half-width of the reflection profile in the wide-angle X-ray diffraction method (200) with the use of Cu-Kα ray (50 kV, 200 mA).

In the present invention, alkaline earth metal compounds other than the above-mentioned mixed crystals (1) or magnesium hydroxide can be used. More particularly, at least one compound selected from the group consisting of magnesium hydroxide, calcium hydroxide, strontium hydroxide and barium hydroxide may preferably used.

As these alkaline earth metal hydroxides, any alkaline earth metal hydroxides may be used (for example, one obtained by treating an alkaline earth metal salt with an alkali, one obtained by soaking an alkaline earth metal oxide in warm water at around 80° C. for several hours), so long as it has a final alkaline earth metal hydroxide content of at least 95% by mol. The alkaline earth metal hydroxide has an average particle size of preferably 10 μm or below, still preferably 9 μm or below. In addition, the microcrystalline size thereof is preferably about 1,000 Å. The microcrystalline size as described herein is a value calculated by the Scherrer method from the half-width of the reflection profile in the wide-angle X-ray diffraction method (200) with the use of Cu-Kα ray (50 kV, 200 mA).

As the alkaline earth metal compound to be employed in the present invention, it is also possible to use a baked mixture prepared by baking at least two compounds selected from alkaline earth metal hydroxides and alkaline earth metal carbonates.

Although the above-mentioned baked mixture is not restricted in composition, crystalline structure, particle size, etc., it is preferable to use a mixture in which at least one of alkaline earth metal hydroxide and alkaline earth metal carbonate employed as the starting material has been converted into the corresponding alkaline earth metal oxide at a ratio of 5% by mol or above.

Examples of the alkaline earth metal hydroxides and alkaline earth metal carbonates include magnesium hydroxide, calcium hydroxide, strontium hydroxide, barium hydroxide, magnesium carbonate, calcium carbonate, strontium carbonate and barium carbonate.

In the preparation the baked alkaline earth metal compounds, the composition ratio of the alkaline earth metal hydroxide or carbonate may be an arbitrary one, so long as at least two of these compounds are employed. It is also possible to use a product prepared by once baking one or more compounds, then adding another unbaked compound thereto and baking the resulting mixture again.

In this process, baking may be carried out by using an electric oven, etc. either in the air or in a nitrogen or oxygen atmosphere, or in vacuo.

The baking temperature and baking time may be appropriately selected depending on the combination of the materials. Namely, baking may be carried out under such conditions as to allow the liberation of water and carbon dioxide from the starting alkaline earth metal hydroxides or carbonates (at least one of which has been converted into the corresponding alkaline earth metal oxide at a ratio of 5% by mol or above). Usually, baking may be carried out at 300° to 1,500° C. for 0.5 to 30 hours.

The above-described alkaline earth metal hydroxides or carbonates are not limited to the baked mixture and may be a mixture of two or more inorganic compounds selected from the group consisting of magnesium hydroxide, calcium hydroxide, strontium hydroxide, barium hydroxide, magnesium carbonate, calcium carbonate, strontium carbonate and barium carbonate.

The polyamide resin composition of the present invention may be produced by any processes, so long as the polyamide can be uniformly mixed with the alkaline earth metal compound. In usual, the kneading method with the use of an extruder is employed. In the step of kneading in an extruder, the screw size and the extrusion rate are regulated respectively to preferably 20 mm or above and 10 g/min or above, so as to enable the uniform dispersion of the alkaline earth metal compound into the polyamide resin. It is also possible to knead magnesium stearate, etc. to improve the workability.

The resin composition of the present invention may further contain heat stabilizers, weathering agents, inorganic fillers, reinforcements, antioxidants, impact resistance improvers, plasticizers, pigments, lubricants, flame-retardants, etc., so long as the physical properties of the composition are not deteriorated.

Moreover, the resin composition of the present invention may be mixed with thermoplastic resins other than polyamide. Particular examples of such thermoplastic resins include elastomers (for example, polybutadiene, butadiene/styrene copolymer, acrylic rubber, ethylene/propylene copolymer, ethylene/propylene/butadiene copolymer, natural rubber, chlorinated butyl rubber, chlorinated polyethylene) which have been optionally denatured with acids such as maleic anhydride, styrene/maleic anhydride copolymer, styrene/phenylmaleimide copolymer, polyethylene, polypropylene, butadiene/acrylonitrile copolymer, poly(vinyl chloride), poly(ethylene terephthalate), poly(butylene terephthalate), polyacetal, poly(vinylidene fluoride), polysulfone, poly(phenylene sulfide), poly(ether sulfone), phenoxy resin, poly(phenylene ether), poly(methyl methacrylate), poly(ether ketone), polycarbonate, polytetrafluoroethylene, polyarylate and polyimide.

In the present invention, the above-mentioned resin composition may be further processed into fibers, films or molded articles by conventional methods.

Although it has not been clarified so far why the formation of a cyclic monomer in the step of re-melting can be suppressed in the polyamide resin composition of the present invention, it is considered as follows. In the resin composition, the terminal group of the polyamide is coordinated (interaction) to the active site of the above-described alkaline earth metal compound to thereby stabilize the polyamide molecules and the formation of a cyclic monomer is suppressed even in the step of melting at a high temperature. Thus, neither yarn breakage, yarn unevenness nor film breakage occurs in the course of melt spinning or film formation, which enables stable operation.

In order to further illustrate the present invention in greater detail, the following Examples will be given.

The materials and measurement methods employed in these Examples and Comparative Examples are as follows.

1. Materials

Calcium hydroxide: manufactured by Ishizu Seiyaku, reagent grade.
Strontium hydroxide: manufactured by Aldrich Chemical Company.
Calcium carbonate: manufactured by Ishizu Seiyaku, reagent grade.
Calcium oxide: manufactured by Ishizu Seiyaku, reagent grade.
Nylon 6 homopolymer chip: A1030BRL, manufactured by Unitika, relative viscosity=2.5.
Nylon 6/66 copolymer chip: 5013B, manufactured by Ube Industries, caproamide unit=85% by mol, hexamethylene adipamide unit=15% by mol, relative viscosity=2.5.
Magnesium hydroxide: manufactured by Ako Kasei, average particle size=2.9 $\mu$m, microcrystalline size=1000 Å.
Magnesium oxide: manufactured by Dainichi Chemical Industry, average particle size=4.3 $\mu$m.
Mixed crystals (A): $(MgO)_{0.68}(Mg(OH)_2)_{0.32}$ obtained by baking magnesium hydroxide (average particle size=2.9 $\mu$m) at 400° C. for 3 hours. Average particle size of mixed crystals (A)=1.1 $\mu$m, MgO microcrystalline size=250 Å.
Baked mixture (B): obtained by mixing magnesium hydroxide with calcium hydroxide at a weight ratio of 1:1, baking the mixture in an electric oven under nitrogen atmosphere at 500° C. for 5 hours and then slowly cooling it to room temperature. This mixture (B) contained 56% by mol of magnesium oxide and 44% by mol of calcium oxide.

2. Measurement method $\epsilon$-caprolactam (cyclic monomer) Content

A resin composition containing not more than 0.02% by weight of moisture was molten at 0.01 Torr or below at 250° C. for 8 hours. After freeze-grinding, the $\epsilon$-caprolactam contained in this ground matter was determined.

After extracting the above-mentioned ground matter with hot water at 100° C. for 5 hours, the $\epsilon$-caprolactam contained in the extract was determined with a high performance liquid chromatograph (600E manufactured by Waters).

The high performance liquid chromatography was performed under the following conditions:

column: $C_{18}$ (manufactured by Waters, 250 mm in length, 4.6 mm in inner diameter)
eluent: methanol/water (35/65 by volume)
flow rate: 0.7 ml/min
detector: UV 210 nm.

Contents (% by mol) of Oxide in Mixed Crystals and Baked Mixture

Each sample powder was subjected to the determination with the use of a wide-angle X-ray diffraction meter (RAD-rB, manufactured by Rigaku Corporation).

In the wide-angle X-ray diffraction method, Cu-K$\alpha$ ray (50 kV, 200 mA) was used.

Composition Ratio in Mixed Crystals and Baked Mixture

A calibration curve was created by using samples having known concentrations of each alkaline earth metal oxide after baking. Next, the inorganic compound was analyzed by the x-ray diffraction method and the contents was calculated on the basis of the peak strength.

Average Particle Size

Using a microtrack particle size analyzer (Model 7995 Series SPA/SRA manufactured by Nikkiso Company), measured in methanol.

EXAMPLE 1

100 parts by weight of nylon 6 homopolymer chips were mixed with 0.5 parts by weight of the mixed crystals (A) and the resulting mixture was kneaded in an extruder to thereby give chips of a resin composition in which nylon 6 and the mixed crystals (A) had been uniformly mixed.

In this step, the temperature in the extruder was regulated at 3 levels, i.e., 205°, 255° and 265° C. and the residence time was 10 minutes.

Next, these chips were dried under reduced pressure at 100° C. for 12 hours so as to reduce the moisture content to 0.02% by weight or below. Then, the mixture was molten in a glass tube at 0.01 Torr or below at 250° C. for 8 hours.

After melting, the resin composition was freeze-ground in liquid nitrogen. Subsequently, the $\epsilon$-caprolactam content in this ground matter was determined by high performance liquid chromatography.

EXAMPLE 2

The procedure of Example 1 was repeated except that magnesium hydroxide was used instead of the mixed crystals (A). Thus, a ground resin composition was obtained and the $\epsilon$-caprolactam contained was similarly determined.

EXAMPLE 3

The procedure of Example 1 was repeated except that calcium hydroxide was used instead of the mixed crystals (A). Thus, a ground resin composition was obtained and the $\epsilon$-caprolactam contained was similarly determined.

EXAMPLE 4

The procedure of Example 1 was repeated except that the baked mixture (B) was used instead of the mixed crystals (A). Thus, a ground resin composition was obtained and the $\epsilon$-caprolactam contained was similarly determined.

COMPARATIVE EXAMPLE 1

Nylon 6 homopolymer chips were dried under reduced pressure at 100° C. for 12 hours so as to reduce the moisture content to 0.02% by weight or below. Then, the chips were molten in a glass tube at 0.01 Torr or below at 250° C. for 8 hours.

After melting, the nylon 6 was freeze-ground in liquid nitrogen. Subsequently, the $\epsilon$-caprolactam content in this ground matter was determined by high performance liquid chromatography.

COMPARATIVE EXAMPLE 2

The procedure of Example 1 was repeated except that magnesium oxide was used instead of the mixed crystals (A). Thus, a ground resin composition was obtained and the $\epsilon$-caprolactam contained was similarly determined.

EXAMPLE 5

100 parts by weight of nylon 6 homopolymer chips were mixed with 1.0 parts by weight of the mixed crystals (A) and the resulting mixture was kneaded in an extruder to thereby give chips of a resin composition in which nylon 6 had been uniformly mixed with the mixed crystals (A).

In this step, the temperature in the extruder was regulated at 3 levels, i.e., 205°, 255° and 265° C. and the residence time was 10 minutes.

Next, these chips were dried under reduced pressure at 100° C. for 12 hours so as to reduce the moisture content to 0.02% by weight or below. Then, the mixture was molten in a glass tube at 0.01 Torr or below at 250° C. for 8 hours.

After melting, the resin composition was freeze-ground in liquid nitrogen. Subsequently, the $\epsilon$-caprolactam content in this ground matter was determined by high performance liquid chromatography.

EXAMPLE 6

The procedure of Example 5 was repeated except that magnesium hydroxide was used instead of the mixed crystals (A). Thus, a ground resin composition was obtained and the $\epsilon$-caprolactam contained was similarly determined.

COMPARATIVE EXAMPLE 3

The procedure of Example 5 was repeated except that magnesium oxide was used instead of the mixed crystals (A). Thus, a ground resin composition was obtained and the $\epsilon$-caprolactam contained was similarly determined.

EXAMPLE 7

100 parts by weight of nylon 6/nylon 66 copolymer chips were mixed with 0.5 parts by weight of the mixed crystals (A), and the resulting mixture was kneaded in an extruder to thereby give chips of a resin composition in which the copolymer had been uniformly mixed with the mixed crystals (A).

In this step, the temperature in the extruder was regulated at 3 levels, i.e., 205°, 255° and 265° C. and the residence time was 10 minutes.

Next, these chips were dried under reduced pressure at 100° C. for 12 hours so as to reduce the moisture content to 0.02% by weight or below. Then, the mixture was molten in a glass tube at 0.01 Torr or below at 250° C. for 8 hours.

After melting, the resin composition was freeze-ground in liquid nitrogen. Subsequently, the $\epsilon$-caprolactam content in this ground matter was determined by high performance liquid chromatography.

EXAMPLE 8

The procedure of Example 7 was repeated except that magnesium hydroxide was used instead of the mixed crystals (A). Thus, a ground resin composition was obtained and the $\epsilon$-caprolactam contained was similarly determined.

EXAMPLE 9

The procedure of Example 7 was repeated except that calcium hydroxide was used instead of the mixed crystals (A). Thus, a ground resin composition was obtained and the $\epsilon$-caprolactam contained was similarly determined.

EXAMPLE 10

The procedure of Example 7 was repeated except that the baked mixture (B) was used instead of the mixed crystals (A). Thus, a ground resin composition was obtained and the $\epsilon$-caprolactam contained was similarly determined.

COMPARATIVE EXAMPLE 4

Nylon 6/nylon 66 copolymer chips were dried under reduced pressure at 100° C. for 12 hours so as to reduce the moisture content to 0.02% by weight or below. Then, the chips were molten in a glass tube at 0.01 Torr or below at 250° C. for 8 hours.

After melting, the nylon 6 was freeze-ground in liquid nitrogen. Subsequently, the $\epsilon$-caprolactam content in this ground matter was determined by high performance liquid chromatography.

COMPARATIVE EXAMPLE 5

The procedure of Example 7 was repeated except that magnesium oxide was used instead of the mixed crystals (A). Thus, a ground resin composition was obtained and the $\epsilon$-caprolactam contained was similarly determined.

EXAMPLE 11

100 parts by weight of nylon 6/nylon 66 copolymer chips were mixed with 1.0 parts by weight of the mixed crystals (A), and the resulting mixture was kneaded in an extruder to thereby give chips of a resin composition in which the copolymer had been uniformly mixed with the mixed crystals (A).

In this step, the temperature in the extruder was regulated at 3 levels, i.e., 205°, 255° and 265° C. and the residence time was 10 minutes.

Next, these chips were dried under reduced pressure at 100° C. for 12 hours so as to reduce the moisture content to 0.02% by weight or below. Then, the mixture was molten in a glass tube at 0.01 Torr or below at 250° C. for 8 hours.

After melting, the resin composition was freeze-ground in liquid nitrogen. Subsequently, the ε-caprolactam content in this ground matter was determined by high performance liquid chromatography.

EXAMPLE 12

The procedure of Example 11 was repeated except that magnesium hydroxide was used instead of the mixed crystals (A). Thus, a ground resin composition was obtained and the ε-caprolactam contained was similarly determined.

COMPARATIVE EXAMPLE 6

The procedure of Example 11 was repeated except that magnesium oxide was used instead of the mixed crystals (A). Thus, a ground resin composition was obtained and the ε-caprolactam contained was similarly determined.

Table 1 summarizes the results of the above Examples 1 to 12 and Comparative Examples 1 to 6.

time when a yarn breakages occurred and the yarn breakages occurred during this period were counted.

EXAMPLE 14

The procedure of Example 13 was repeated except that 0.05 parts by weight of magnesium hydroxide was added to 100 parts by weight of the nylon 6 homopolymer chips. Spinning was continued for 1 week and the yarn breakages occurred during this period were similarly counted.

EXAMPLE 15

The procedure of Example 13 was repeated except that 0.05 parts by weight of calcium hydroxide was added to 100 parts by weight of the nylon 6 homopolymer chips. Spinning was continued for 1 week and the yarn breakages occurred during this period were similarly counted.

EXAMPLE 16

The procedure of Example 13 was repeated except that 0.05 parts by weight of the baked mixture (B) was added to 100 parts by weight of the nylon 6 homopolymer chips. Spinning was continued for 1 week and the yarn breakages occurred during this period were similarly counted.

COMPARATIVE EXAMPLE 7

The procedure of Example 13 was repeated except that no magnesium hydroxide was used. Spinning was continued for

TABLE 1

| | Chip | Alkaline Earth Metal Compound Compound | Content (part by weight) | ε-caprolactam content (part by weight) |
|---|---|---|---|---|
| Example | | | | |
| 1 | Nylon 6 | Mixed crystal (A) | 0.5 | 0.56 |
| 2 | Nylon 6 | Magnesium Hydroxide | 0.5 | 0.62 |
| 3 | Nylon 6 | Calcium Hydroxide | 0.5 | 0.66 |
| 4 | Nylon 6 | Baked Mixture (B) | 0.5 | 0.61 |
| 5 | Nylon 6 | Mixed Crystal (A) | 1.0 | 0.43 |
| 6 | Nylon 6 | Magnesium Hydroxide | 1.0 | 0.48 |
| 7 | Nylon 6/66 copolymer | Mixed Crystal (A) | 0.5 | 0.51 |
| 8 | Nylon 6/66 copolymer | Magnesium Hydroxide | 0.5 | 0.58 |
| 9 | Nylon 6/66 copolymer | Calcium Hydroxide | 0.5 | 0.58 |
| 10 | Nylon 6/66 copolymer | Baked Mixture (B) | 0.5 | 0.56 |
| 11 | Nylon 6/66 copolymer | Mixed Crystal (A) | 1.0 | 0.38 |
| 12 | Nylon 6/66 copolymer | Magnesium Hydroxide | 1.0 | 0.40 |
| Comparative Example | | | | |
| 1 | Nylon 6 | — | — | 3.99 |
| 2 | Nylon 6 | Magnesium Oxide | 0.5 | 1.20 |
| 3 | Nylon 6 | Magnesiuin Oxide | 1.0 | 1.02 |
| 4 | Nylon 6/66 copolymer | — | — | 3.65 |
| 5 | Nylon 6/66 copolymer | Magnesium Oxide | 0.5 | 1.01 |
| 6 | Nylon 6/66 copolymer | Magnesium Oxide | 1.0 | 0.90 |

EXAMPLE 13

100 parts by weight of Nylon 6 homopolymer chips were mixed with 0.05 parts by weight of the mixed crystals (A). The resulting mixture was supplied into an extruder and subjected to melt spinning at 255° C.

The spinning head employed in this step was one having 24 holes and Y-shaped nozzle tips. The mixture was extruded at a rate of 29 g/min and wound up at a rate of 4,000 m/min to give yarns of 65 denier 24 filaments.

Spinning was continued for 1 week while removing heat denaturation products formed around the nozzle tips each 1 week and the yarn breakages occurred during this period were similarly counted.

COMPARATIVE EXAMPLE 8

The procedure of Example 13 was repeated except that 0.05 parts by weight of magnesium oxide was added to 100 parts by weight of the nylon 6 homopolymer chips. Spinning was continued for 1 week and the yarn breakages occurred during this period were similarly counted.

EXAMPLE 17

100 parts by weight of nylon 6/nylon 66 copolymer chips were mixed with 0.05 parts by weight of the mixed crystals (A). The mixture thus obtained was supplied into an extruder and subjected to melt spinning at 255° C.

The spinning head employed in this step was one having 24 holes and Y-shaped nozzle tips. The mixture was extruded at a rate of 29 g/min and wound up at a rate of 4,000 m/min to thereby give yarns of 65 denier 24 filaments.

Spinning was continued for 1 week while removing heat denaturation products formed around the nozzle tips when yarn breakage occurred and the yarn breakages occurred during this period were counted.

parts by weight of the nylon 6/nylon 66 copolymer chips. Spinning was continued for 1 week and the yarn breakages occurred during this period were similarly counted.

Table 2 summarizes the results of the above Examples 13 to 20 and Comparative Examples 7 to 10.

TABLE 2

|  | Chip | Alkaline Earth Metal Compound | | Yarn Breakage Frequency Per Head(/day) |
|---|---|---|---|---|
|  |  | Compound | Content (part by weight) |  |
| Example |  |  |  |  |
| 13 | Nylon 6 | Mixed crystal (A) | 0.05 | 0.14 |
| 14 | Nylon 6 | Magnesium Hydroxide | 0.05 | 0.16 |
| 15 | Nylon 6 | Caicium Hydroxide | 0.05 | 0.17 |
| 16 | Nylon 6 | Baked Mixture (B) | 0.05 | 0.18 |
| 17 | Nylon 6/66 copolymer | Mixed Crystal (A) | 0.05 | 0.17 |
| 18 | Nylon 6/66 copolymer | Magnesium Hydroxide | 0.05 | 0.15 |
| 19 | Nylon 6/66 copolymer | Caicium Hydroxide | 0.05 | 0.19 |
| 20 | Nylon 6/66 copolymer | Baked Mixture (B) | 0.05 | 0.15 |
| Comparative Example |  |  |  |  |
| 7 | Nylon 6 | — | — | 0.60 |
| 8 | Nylon 6 | Magnesium Oxide | 0.05 | 0.20 |
| 9 | Nylon 6/66 copolymer | — | — | 0.80 |
| 10 | Nylon 6/66 copolymer | Magnesium Oxide | 0.05 | 0.25 |

EXAMPLE 18

The procedure of Example 17 was repeated except that 0.05 parts by weight of magnesium hydroxide was added to 100 parts by weight of the nylon 6/nylon 66 copolymer chips. Spinning was continued for 1 week and the yarn breakages occurred during this period were similarly counted.

EXAMPLE 19

The procedure of Example 17 was repeated except that 0.05 parts by weight of calcium hydroxide was added to 100 parts by weight of the nylon 6/nylon 66 copolymer chips. Spinning was continued for 1 week and the yarn breakages occurred during this period were similarly counted.

EXAMPLE 20

The procedure of Example 17 was repeated except that 0.05 parts by weight of the baked mixture (B) was added to 100 parts by weight of the nylon 6/nylon 66 copolymer chips. Spinning was continued for 1 week and the yarn breakages occurred during this period were similarly counted.

COMPARATIVE EXAMPLE 9

The procedure of Example 17 was repeated except that no magnesium hydroxide was used. Spinning was continued for 1 week and the yarn breakages occurred during this period were similarly counted.

COMPARATIVE EXAMPLE 10

The procedure of Example 17 was repeated except that 0.05 parts by weight magnesium oxide was added to 100

EXAMPLE 21

1.0 parts by weight of the mixed crystals (A) were added to 100 parts by weight of nylon 6 homopolymer chips, and the resulting mixture was subjected to injection molding by using a twin-screw extruder (Model PCM-45, manufactured by Ikegai Corporation) at a cylinder temperature of 250° C. and a mold temperature of 70° C. for 2,000 cycles with each cycle consisting of an injection time of 6 seconds and a cooling time of 6 seconds. As a result, the mold was not soiled.

COMPARATIVE EXAMPLE 11

Nylon 6 homopolymer chips were subjected to injection molding by using a twin-screw extruder (Model PCM-45, manufactured by Ikegai Corporation) at a cylinder temperature of 250° C. and a mold temperature of 70° C. for 2,000 cycles with each cycle consisting of an injection time of 6 seconds and a cooling time of 6 seconds. As a result, the mold was soiled.

EXAMPLE 22

1.0 parts by weight of the mixed crystals (A) was added to 100 parts by weight nylon 6 homopolymer chips, and the resulting mixture was molten at 260° C. Then, it was extruded from an extruder provided with a T-die, and the resulting molded sheet was solidified by quenching to give a nylon 6 film of an average thickness of 170 µm. As a result, the T-die was not soiled.

COMPARATIVE EXAMPLE 12

Nylon 6 homopolymer chips were molten at 260° C. Then, it was extruded from an extruder provided with a T-die, and the resulting molded sheet was solidified by quenching to give a nylon 6 film of an average thickness of 170 μm. As a result, the T-die was soiled.

While the invention has been described in detail and with reference to specific embodiments thereof, it will be apparent to one skilled in the art that various changes and modifications can be made therein without departing from the spirit and scope thereof.

What is claimed is:

1. A polyamide resin composition, comprising a polyamide and an alkaline earth metal compound, wherein said polyamide resin composition contains not more than 0.7 parts by weight of cyclic monomer of said polyamide per 100 parts by weight of said polyamide when said polyamide resin composition is melted under the conditions of a moisture content of 0.02% by weight or less, a pressure of 0.01 Torr or below, a temperature of 250° C., and a heating time of 8 hours.

2. The polyamide resin composition as claimed in claim 1, wherein said polyamide is a homopolymer of nylon 6.

3. The polyamide resin composition as claimed in claim 1, wherein said polyamide is a copolymer of nylon 6.

4. The polyamide resin composition as claimed in claim 1, wherein said copolymer of nylon 6 contains at least 50% by mol of caproamide units.

5. The polyamide resin composition as claimed in claim 1, wherein said alkaline earth metal compound is present in said polyamide resin composition in an amount from 0.01 to 2 parts by weight based on 100 parts by weight of said polyamide.

6. A polyamide resin composition, comprising a polyamide and magnesium compound mixed crystals represented by the following formula (1):

$$(MgO)_x(Mg(OH)_2)_{1-x} \quad (1)$$

wherein x represents a molar fraction and 0<x<1, wherein said polyamide resin composition contains not more than 0.7 parts by weight of cyclic monomer of said polyamide per 100 parts by weight of said polyamide when said polyamide resin composition is melted under the conditions of a moisture content of 0.02% by weight or less, a pressure of 0.01 Torr or below a temperature of 250° C., and a heating time of 8 hours.

7. A fiber, which comprising the polyamide resin composition as claimed in claim 1.

8. A fiber, which comprising the polyamide resin composition as claimed in claim 2.

9. A film, which comprising the polyamide resin composition as claimed in claim 1.

10. A film, which comprising the polyamide resin composition as claimed in claim 2.

11. A molded article, which comprising the polyamide resin composition as claimed in claim 1.

12. A molded article, which comprising the polyamide resin composition as claimed in claim 2.

13. The polyamide resin composition as claimed in claims 6, wherein said polyamide is a homopolymer of nylon 6.

14. The polyamide resin composition as claimed in claim 6, wherein said polyamide is a copolymer of nylon 6.

15. The polyamide resin composition of claim 14, wherein said copolymer of nylon 6 contains at least 50% by mol of caproamide units.

16. The polyamide resin composition as claimed in claim 6, wherein said magnesium compound mixed crystals are present in said polyamide resin composition in an amount from 0.01 to 2 parts by weight based on 100 parts by weight of said polyamide.

17. A fiber, comprising the polyamide resin composition as claimed in claim 6.

18. A film, comprising the polyamide resin composition as claimed in claim 6.

19. A molded article, comprising the polyamide resin composition as claimed in claim 6.

* * * * *